A. DE VILBISS, Jr.
SCALE.
APPLICATION FILED DEC. 26, 1903.
1,013,590. Patented Jan. 2, 1912.
3 SHEETS—SHEET 3.
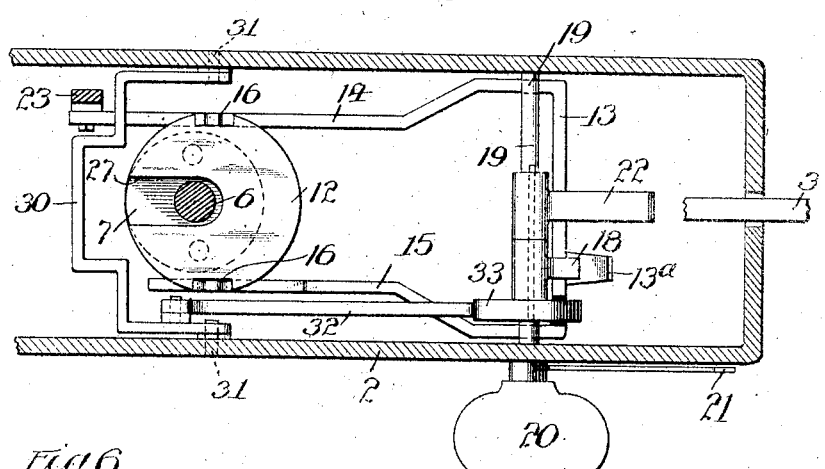
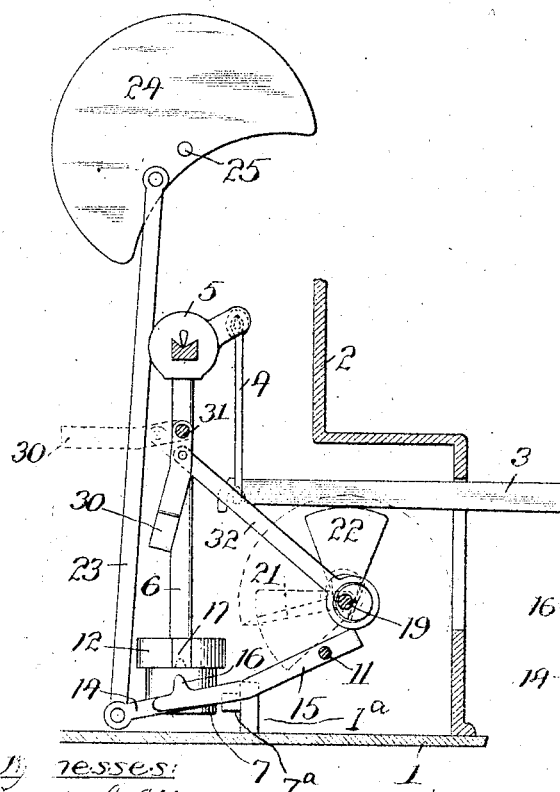
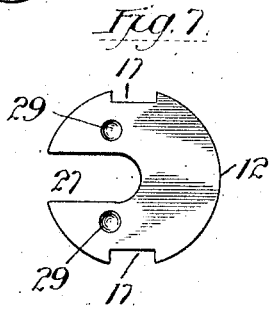
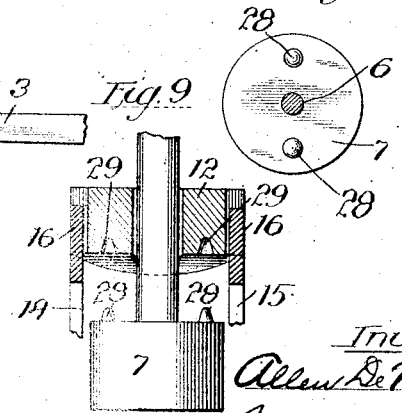

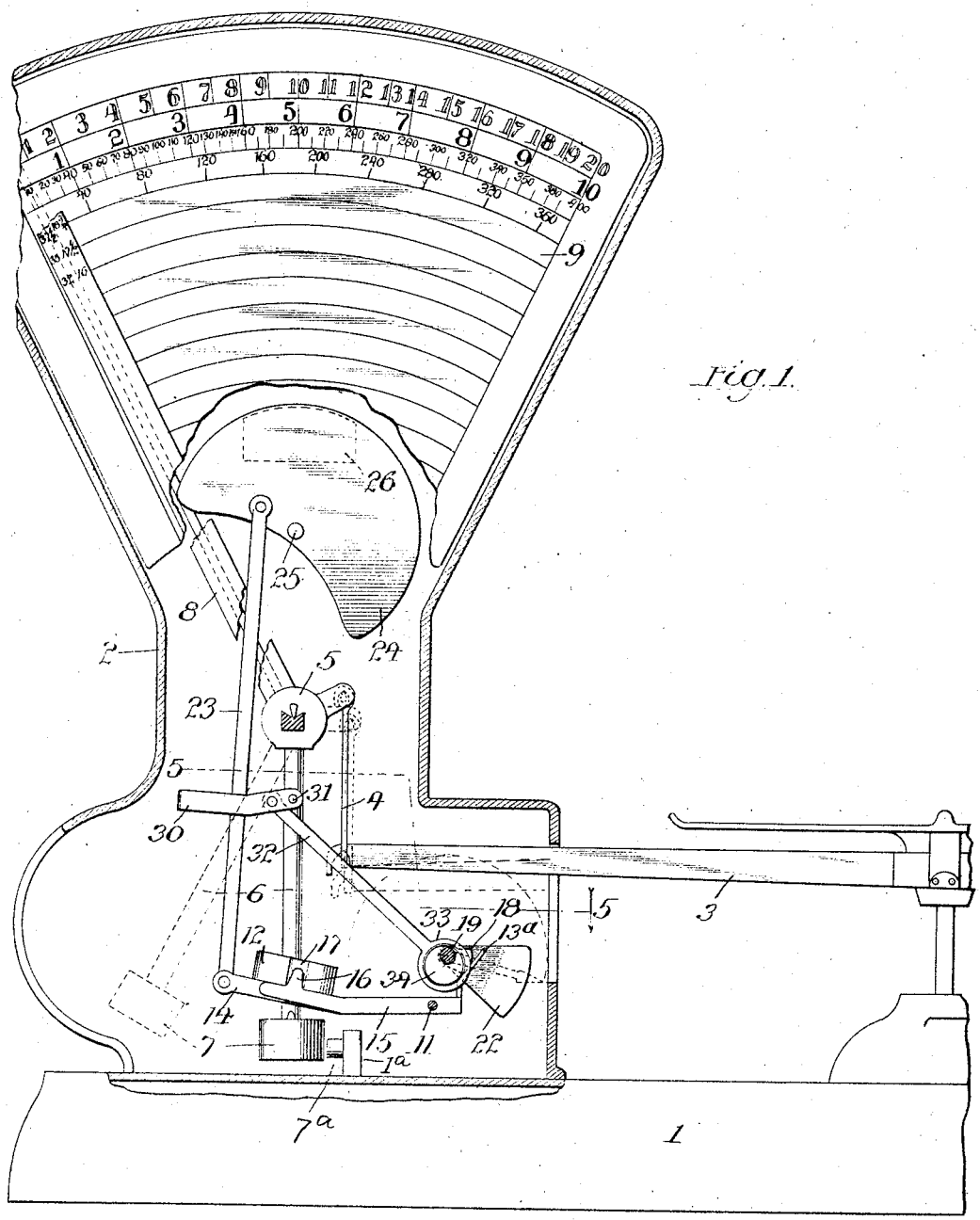

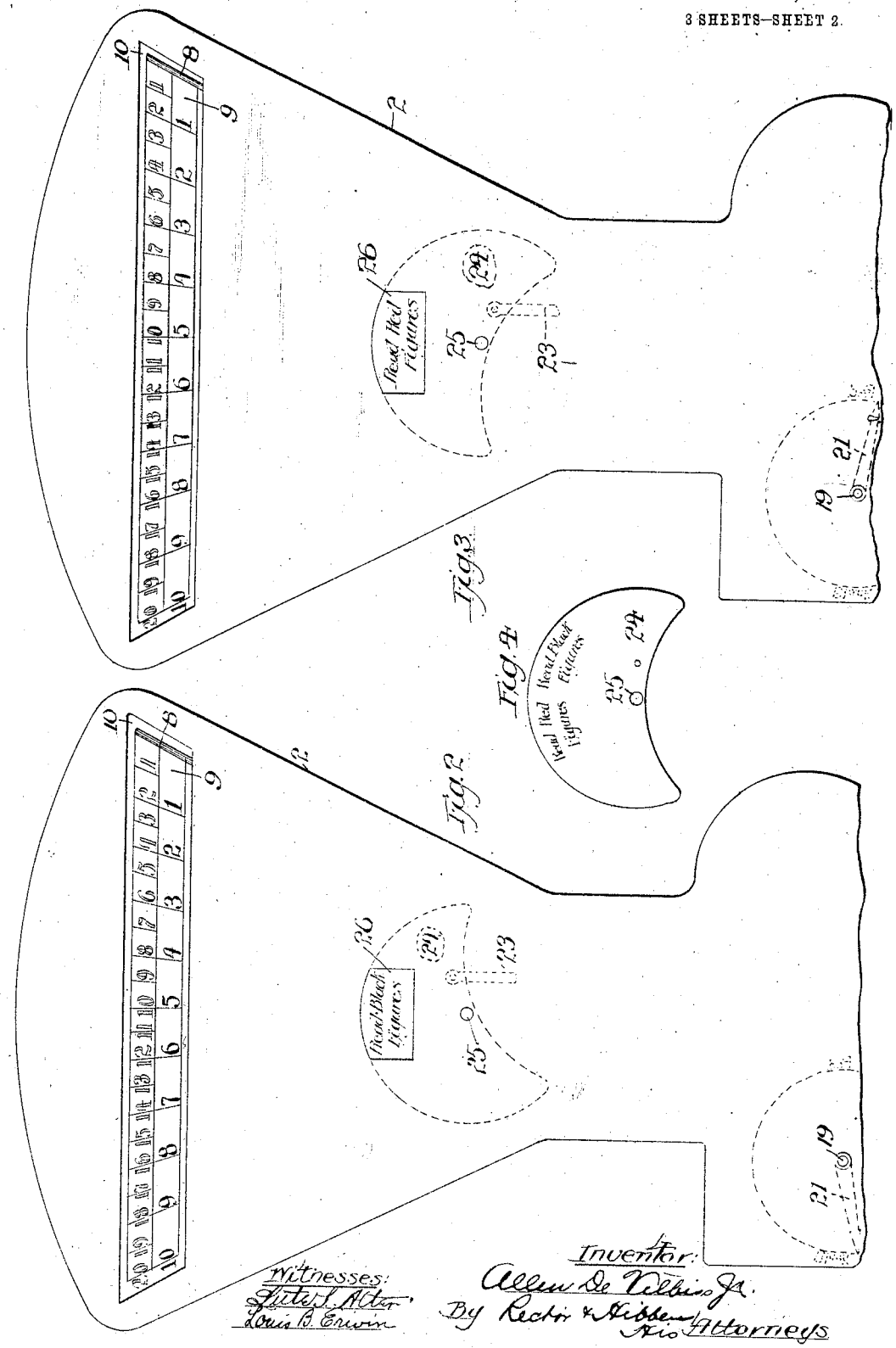

UNITED STATES PATENT OFFICE.

ALLEN DE VILBISS, JR., OF TOLEDO, OHIO, ASSIGNOR TO TOLEDO COMPUTING SCALE COMPANY, OF NEWARK, NEW JERSEY, A CORPORATION OF NEW JERSEY.

SCALE.

1,013,590.  Specification of Letters Patent.  Patented Jan. 2, 1912.

Application filed December 26, 1903. Serial No. 186,686.

*To all whom it may concern:*

Be it known that I, ALLEN DE VILBISS, Jr., residing at Toledo, Lucas county, Ohio, have invented certain new and useful Improvements in Scales, of which the following is a specification.

My invention relates to that kind of scale known as a computing scale, by which are indicated both the weight and the value of an article at any given price per pound or other unit of weight.

This invention has particular applicability to the pendulum type of computing scale, in which a removable pendulum weight is provided in addition to the usual fixed or permanent weight, for the purpose of increasing the weighing capacity and the price-computing range of the scale in the manner fully described in my prior patent, Reissue No. 12,029, dated September 9, 1902.

The object of my present invention is to provide mechanism under the control of the operator or salesman for applying such removable weight to the pendulum and depositing the same properly in place upon the fixed weight, with the result that the scale, in its increased capacity, will indicate both weight and price with absolute accuracy.

I also provide novel and efficient means for indicating to the operator the fact whether the removable weight is in operative or inoperative condition and also what particular weight and price figures to read, whether the red or black ones, according to the selected distinguishing colors adopted.

The various features of advantage and utility in my novel mechanism will be understood from the description hereinafter given.

In the drawings, Figure 1 is an elevation of the principal portion of my scale, with the scale casing in section to expose the working parts within; Figs. 2 and 3 elevations (from the purchaser's side) of the indicating part of the scale; Fig. 4 an elevation of the disk for indicating what figures of the indicator or chart are to be read; Fig. 5 a section on line 5—5 of Fig. 1; Fig. 6 a detail view of the working parts similar to Fig. 1 but with the removable weight deposited on the fixed weight in position to coöperate with the pendulum to increase the weighing and price computing capacity of the scale; Fig. 7 a bottom plan view of the removable weight; Fig. 8 a top plan view of the fixed or permanent weight; and Fig. 9 a detail view showing the relative positions of the two weights when the removable weight is in inoperative condition.

My present scale is a computing scale of the general type and operation of that illustrated in my patent aforesaid, by which both the weight and the value of the article at any given price per pound or other unit of weight are indicated.

As in my prior scale, I employ a price computing table or chart having a plurality of rows of price totals and also having a plurality of rows of weight units, of which the numbers in one row are multiples of those in the other, with all of which rows there coöperates an index having a plurality of rows of price units arranged side by side and having correspondingly arranged numbers in the several rows coöperating with the same rows of price totals. The computing table and index are movable relatively to each other under the influence of the load upon the scale platform, such load being counterbalanced by a weighted pendulum which affords the necessary resistance to such relative movement. In order that the different series of rows of weight units on the table and of the price units on the index may be distinguished and thereby easily read, I prefer to make or print them of contrasting colors, as in the present instance black and red, although any other colors or other means of distinguishing may be adopted. As herein shown, the scale is so constructed as to afford to the customer an indication of the weight only and to the salesman an indication of both the weight and price or value of the article.

In the present instance, as in my said prior patent, a supplemental weight is adapted to be applied to the pendulum for the purpose of increasing the resistance offered thereby to the relative movement of the index and computing table, with the result that the capacity and range of the scale are increased according to the weight of such supplemental weight so applied. In the present scale herein shown and described the weight is such as to double the resistance of the pendulum and thereby double the capacity of the scale. In my said prior patent the supplemental weight was applied to the pendulum and removed therefrom directly by the hand of the operator or salesman.

The object of my present invention is to provide simple and efficient mechanism under the control of the salesman whereby such transfer and removal of the weight may be effected, and also to provide visual signals or indicators for indicating to the customer and salesman whether the supplemental weight is in effective relation with the pendulum or not and accordingly which particular rows of numbers are to be read, the black or the red, if such are the contrasting colors adopted. By this mechanism the supplemental weight is positively and accurately placed in position on the pendulum, that is, superimposed on the usual fixed or permanent weight of the pendulum, as will be made apparent from the detailed description now to be given.

As herein shown, my present scale has a base 1, supporting a casing or housing 2 for the computing table of the scale as well as for the working parts controlled by the usual scale beam 3. This beam projects into the casing and its hook-shaped inner end is connected by a link 4 to the disk 5 of a pendulum 6, which has at its lower end a fixed or permanent weight 7. By preference, I provide a stop or buffer 7ª to check the return movement of the pendulum 7, which stop or buffer is made of any material suitable for the purpose, such as rubber, and support the same on a post 1ª, rising from the top surface of the base portion 1 of the scale, Fig. 1. The index hand 8 is secured to the disk and projects upwardly therefrom at an angle to the pendulum. This index hand is bifurcated so as to coöperate with both sides of the table or chart, which in the present instance and as usual is provided on the salesman's side with both the weight and price-indications and on the purchaser's side with the weight indications only. The chart 9 on the salesman's side is exposed through the open or transparent front of the casing and on the purchaser's side through the slot or sight opening 10 in the casing. The weight indications are shown at the upper end of the table or chart and the figures are arranged in two parallel rows, which rows of figures are by preference distinguished from each other by different colors, as for instance the lower row may be black and the upper row red. In the present instance the weighing capacity of scale is 10 pounds when the fixed weight 7 alone is used and 20 pounds when the removable weight, hereinafter described, is used, and consequently the lower row of weight figures reads from 1 to 10 and the upper row from 1 to 20, as shown in Figs. 1, 2 and 3.

The scale so far described is substantially the same scale as that of my prior patent in which the removable weight, commonly called a ball, was placed on the pendulum and removed therefrom by hand when desired. To enable the operator to so place and remove the weight in an expeditious manner and without in fact handling the same and in order also to place such weight in accurate position are the objects of the additional parts or mechanism now to be described.

By means of pins 11 a carrier frame is pivoted within the casing or housing of the scale and so constructed as to carry or support the removable weight 12 when not required, and to deposit it in operative position on the pendulum when required to increase the capacity of the scale. This frame comprises the cross-bar 13 and the two substantially parallel projecting arms 14 and 15 which extend along opposite sides of the pendulum when in normal position. These arms are provided with upwardly projecting lugs 16 which engage in vertical slots or recesses 17 in opposite sides of the removable weight 12, so that the proper position of such weight on its carrier is always assured and maintained.

The cross bar 13 of the carrier frame is provided in suitable manner with an arm or lug 13ª which extends at an angle thereto and coöperates with a cam 18 secured to or formed as a part of a rock shaft 19. This shaft extends transversely of the casing and bears in opposite walls thereof as seen in Fig. 5, one end thereof extending through the casing and being there provided with a finger piece 20 whereby the operator is enabled to rock the shaft as desired. An indicator or pointer 21, operated by such rock shaft, is employed to point either to the word "Red" or "Black," to indicate whether the red or the black figures on the table or chart are to be read. The rock shaft is also provided with a segment 22 formed separate from or integral with such shaft and arranged to be swung in the same vertical plane as the scale beam, with the result that when swung to a vertical position in the manner illustrated in Fig. 6 the scale beam, if previously in lowered position at this end, will be positively raised and the pendulum thereby restored to normal vertical position. The purpose of this arrangement is to bring the pendulum to proper position before the removable weight or ball is placed or deposited on the fixed weight, or at least to assure such pendulum being in such position.

The arm 14 of the carrier frame is extended beyond the other arm and pivotally connected to a long link or rod 23, whose upper end is pivoted eccentrically on a thin disk 24. This disk is pivoted at 25 to one wall of the scale casing and is provided on the customer's side with suitable signs or indications notifying the customer whether the red or black figures are to be used in reading the weight. In the present instance I have marked on this indicating disk the sets of words "Read red figures" and "Read black figures" so arranged that one or the other set will be exposed to the customer through the sight opening 26 according to the position of the rock shaft and corresponding to the indication by the pointer 21.

When the carrier frame and associated parts are in the normal position shown in Fig. 1, the weighing and computing are done with the use of the fixed weight alone on the pendulum, whose rod is free to swing to the left (Fig. 1) through the side slot 27 formed in the removable weight or ball 12, as clearly illustrated in Figs. 5 and 7. Consequently, the removable weight is now in inoperative condition but ready to be deposited and attached to the fixed weight. At this time, the pointer 21, as well as the disk 24, indicate that the black figures are to be read. In order to deposit the removable weight or ball in place on the fixed weight, the operator, by manipulating the finger piece 20, rocks the shaft 19 in an anticlockwise direction with the result that the segment 22 and cam 19 are rocked in the same direction, the scale beam brought to or maintained in normal position with the pendulum in vertical position, and the carrier frame lowered, all as illustrated in Fig. 6. The removable weight is thereby deposited on the fixed weight, whose projecting pins 28 are received by the corresponding holes 29 in the under face of the removable ball or weight. The carrier frame when swung downwardly as just described entirely clears the removable weight or ball, leaving the latter in place on the fixed weight.

For the purpose of holding the pendulum to an accurate vertical position in order that the removable weight may be deposited with precision, I employ a bail 30, whose parallel arms are pivoted at 31 to opposite walls of the scale casing. To one of these arms is pivoted the upper end of a link or rod 32, whose lower end is provided with or formed as an eccentric strap 33, embracing an eccentric 34 on the rock shaft 19. The construction is such that when the shaft is rocked one half of its full distance of movement, as shown in Fig. 6, or substantially so, the bail 30 is swung to its lowermost or effective position to maintain the pendulum in exactly vertical position. Upon further rocking of the shaft to the left the eccentric swings the bail upwardly to the same horizontal position originally occupied by it. The object of this arrangement is to remove the bail, after performing its functions, out of the range of the pendulum. At this time the pointer 21 and disk 24 indicate that the red figures are to be used in reading the table or chart. When the shaft 19 has been rocked half way the carrier frame has been swung substantially to its lowermost limit, as seen in Fig. 6 and the continued rocking of the shaft to the left has no effect upon the carrier, the only effect being to swing the bail upwardly and the segment 22 downwardly out of range of the scale beam.

To remove the weight the shaft 19 is rocked in a clockwise direction, whereupon the carrier frame is swung upwardly and the weight 12 thereby removed from the fixed weight, the movements of the parts being the reverse of those already described.

It will be understood that the salesman's side of the chart or table exhibits a plurality of rows of price totals but inasmuch as the same form no part of my present invention and moreover are difficult to illustrate, I have shown only the two uppermost rows thereof, leaving the remainder of the chart or table blank. Likewise, I have shown only a few of the price units on the index 8.

I claim:—

1. In a pendulum scale, in combination with a pendulum and indicating devices, a removable weight arranged to coöperate with the pendulum at the will of the operator, a swinging frame having arms between which the weight is supported and arranged to deposit such weight on the pendulum and remove it therefrom, and means for swinging the frame; substantially as described.

2. In a pendulum scale, in combination with a pendulum and indicating devices, a removable weight arranged to coöperate with the pendulum at the will of the operator, a swinging frame consisting of two substantially parallel arms between which the weight is supported and arranged to deposit such weight on the pendulum and remove it therefrom and a cross bar, and means acting on the cross-bar to swing the frame; substantially as described.

3. In a pendulum scale, in combination with a pendulum and indicating devices, a removable weight arranged to coöperate with the pendulum at the will of the operator, a swinging frame consisting of two substantially parallel arms between which the weight is supported and arranged to deposit such weight on the pendulum and remove it therefrom and a cross-bar, and a rock shaft having a cam acting on the cross-bar to swing the frame; substantially as described.

4. In a pendulum scale, in combination with a pendulum and indicating devices, a removable weight arranged to coöperate with the pendulum at the will of the operator, a swinging frame consisting of two substantially parallel arms between which the weight is normally supported and a cross-bar, a pivoted indicator having indications to denote whether the weight is on or off the pendulum, and an operating rod connecting one of said arms and the indicator to operate the latter; substantially as described.

5. In a pendulum scale, in combination with a pendulum and indicating devices, a removable weight arranged to coöperate with the pendulum at the will of the operator, a swinging frame consisting of two substantially parallel arms between which the weight is normally supported and a cross-bar, one of said arms being extended, a pivoted indicator to indicate the position of the frame, and an operating rod connecting said extended arm and the indicator to operate the latter; substantially as described.

6. In a pendulum scale, in combination with a pendulum and indicating devices, a removable weight arranged to coöperate with the pendulum at the will of the operator, and a swinging frame normally supporting such weight and arranged to deposit the same on the pendulum and remove it therefrom, such frame having means for holding the weight in correct position thereon; substantially as described.

7. In a pendulum scale, in combination with a pendulum and indicating devices, a removable weight arranged to coöperate with the pendulum at the will of the operator, said weight having opposite marginal slots, and a swinging frame normally supporting such weight and arranged to deposit the same on the pendulum and remove it therefrom, such frame having lugs arranged to enter said side slots of the weight and thereby hold the latter in proper position on the frame; substantially as described.

8. In a pendulum scale, in combination with a pendulum and indicating devices, a removable weight arranged to coöperate with the pendulum at the will of the operator, mechanism for placing such weight on the pendulum and removing it therefrom, and means for holding the pendulum when the weight is being transferred by said mechanism; substantially as described.

9. In a pendulum scale, in combination with a pendulum and indicating devices, a removable weight arranged to coöperate with the pendulum at the will of the operator, mechanism for placing such weight on the pendulum and removing it therefrom, and means controlled by the movements of such mechanism for holding the pendulum when the weight is being transferred by said mechanism; substantially as described.

10. In a pendulum scale, in combination with a pendulum and indicating devices, a removable weight arranged to coöperate with the pendulum at the will of the operator, mechanism for placing such weight on the pendulum and removing it therefrom, and means for holding the pendulum when the weight is being transferred by said mechanism, said means comprising a bail arranged to swing in the path of movement of the pendulum and arrest its movements and means for swinging said bail; substantially as described.

11. In a pendulum scale, in combination with a pendulum and indicating devices, a removable weight arranged to coöperate with the pendulum at the will of the operator, mechanism for transferring said weight to the pendulum and removing it therefrom, and a bail arranged to be swung in unison with said mechanism for arresting the movements of the pendulum; substantially as described.

12. In a pendulum scale, in combination with a pendulum and indicating devices, a removable weight arranged to coöperate with the pendulum at the will of the operator, mechanism for transferring said weight to the pendulum and removing it therefrom, a bail arranged to arrest the movements of the pendulum, and means common to said mechanism and bail for operating them; substantially as described.

13. In a pendulum scale, in combination with a pendulum and indicating devices, a removable weight arranged to coöperate with the pendulum at the will of the operator, mechanism for transferring said weight to the pendulum and removing it therefrom, a bail arranged to arrest the movements of said pendulum, a rock shaft for operating said mechanism, and an operative connection between the shaft and bail; substantially as described.

14. In a pendulum scale, in combination with a pendulum and indicating devices, a removable weight arranged to coöperate with the pendulum at the will of the operator, mechanism for transferring said weight to the pendulum and removing it therefrom, a bail arranged to arrest the movements of said pendulum, a rock shaft for operating said mechanism, an eccentric on said shaft, and an operating rod connected to said bail and actuated by said eccentric; substantially as described.

15. In a pendulum scale, in combination with a pendulum and indicating devices, a removable weight arranged to coöperate with the pendulum at the will of the operator, mechanism for transferring said weight to the pendulum and removing it therefrom, a bail arranged to arrest the movements of said pendulum, a rock shaft for operating said mechanism, an eccentric on said shaft, and an operating rod connected to said bail and having a strap to embrace said eccentric; substantially as described.

16. In a pendulum scale, in combination with a pendulum and indicating devices, a removable weight arranged to coöperate with the pendulum at the will of the operator, mechanism for transferring said weight to the pendulum and removing it therefrom, a bail pivoted toward the upper end of the pendulum and when swung downward arranged to arrest the movements of the pendulum, and means for operating said bail; substantially as described.

17. In a pendulum scale, in combination with a pendulum and indicating devices, a removable weight arranged to coöperate with the pendulum at the will of the operator, mechanism for transferring said weight to the pendulum and removing it therefrom, a bail which is pivoted by its side arms toward the upper end of the pendulum and when swung downward arranged to arrest the movements of the pendulum, a rock shaft, and an operating link actuated by such shaft and pivoted to one of the side arms of the bail; substantially as described.

18. In a pendulum scale, in combination with a pendulum and indicating devices, a removable weight arranged to coöperate with the pendulum at the will of the operator, a swinging frame for transferring said weight to the pendulum and removing it therefrom, a swinging bail to arrest the movements of the pendulum, a rock shaft for operating said frame and bail and upon substantially a quarter turn arranged to fully swing the frame and to swing the bail in effective position against the pendulum, and upon a further quarter turn arranged to remove the bail from its effective position; substantially as described.

19. In a pendulum scale, the combination with the pendulum, indicating devices, and a scale beam, of means adapted to place additional weight on the pendulum when in normal position only, and manually operable means to restore the beam and pendulum to normal position.

20. In a pendulum scale, in combination with a pendulum, indicating devices and a scale beam, an arm adapted and arranged to move into contact with the scale beam to restore it and the pendulum to normal position, and means adapted to place additional weight on the pendulum when in such position only.

21. In a pendulum scale, the combination of a pendulum, indicating means and a scale beam, a rock shaft having a projection to restore the beam and therefore the pendulum to normal position, and means adapted to place additional weight on the pendulum when in such position only.

22. In a pendulum scale, in combination with a pendulum, indicating devices, and a scale beam, a removable weight arranged to coöperate with the pendulum, mechanism normally carrying such weight and arranged to deposit the same on the pendulum, and means operated in unison with said mechanism for moving said pendulum to normal position; substantially as described.

23. In a pendulum scale, in combination with a pendulum, indicating devices, and a scale beam, a removable weight arranged to coöperate with the pendulum, mechanism normally carrying such weight and arranged to transfer the same to the pendulum, means for restoring the pendulum to normal position, and a rock shaft for actuating both said mechanism and said means; substantially as described.

24. In a pendulum scale, in combination with a pendulum, indicating devices, and a scale beam, a removable weight arranged to coöperate with the pendulum, mechanism normally carrying such weight and arranged to transfer the same to the pendulum, means for restoring the pendulum to normal position, means for arresting the movements of the pendulum, and manually operated means for actuating said mechanism and also the restoring and arresting means; substantially as described.

25. In a pendulum scale, in combination with a pendulum and indicating devices, a removable weight arranged to coöperate with the pendulum at the will of the operator, a swinging carrier frame for transferring said weight to the pendulum and removing it therefrom, a projection on said frame, and a manually operated rock shaft having a cam coöperating with said projection to swing the frame; substantially as described.

26. In a pendulum scale, in combination with a pendulum and indicating devices, a removable weight arranged to coöperate with the pendulum at the will of the operator, a swinging carrier frame comprising a cross-bar and two substantially parallel arms extending on either side of the pendulum and arranged to normally carry said weight and to transfer it to the pendulum when desired, an arm projecting from the cross-bar, and a manually operated rock shaft having a cam coöperating with said arm to swing the frame; substantially as described.

27. In a pendulum scale, in combination with a pendulum and indicating devices, a removable weight arranged to coöperate with the pendulum at the will of the operator, mechanism normally carrying such weight and arranged to transfer it to the pendulum, two indicators for the customer and salesman respectively for indicating whether said weight is in coöperative relation with the pendulum or not, and means for operating said mechanism and indicators in unison; substantially as described.

28. In a pendulum scale, in combination with a pendulum and indicating devices, a removable weight arranged to coöperate with the pendulum at the will of the operator, a movable frame normally carrying such weight and arranged to transfer it to the pendulum, an indicator controlled by the movements of said frame for indicating to the customer whether said weight is in coöperative relation with the pendulum or not, a second indicator for a like purpose for the use of the salesman, and means for simultaneously actuating said frame and the second indicator, substantially as described.

29. In a pendulum scale, in combination with a pendulum and indicating devices, a removable weight arranged to coöperate with the pendulum at the will of the operator, a movable frame normally carrying such weight and arranged to transfer it to the pendulum, an indicator controlled by the movements of said frame for indicating to the customer whether said weight is in coöperative relation with the pendulum or not, a second indicator for a like purpose for the use of the salesman, and a rock shaft having a cam for actuating said frame and also carrying such second indicator; substantially as described.

30. In a pendulum scale, in combination with a scale casing, a pendulum and indicating devices therein, a removable weight arranged to coöperate with the pendulum at the will of the operator, a movable frame normally carrying such weight and arranged to transfer it to the pendulum, a customer's indicator controlled by the movements of the frame for indicating whether said weight is in coöperative relation with the pendulum, a rock shaft journaled in the casing and arranged to actuate the frame, and a salesman's indicator mounted on the rock shaft outside the casing for the same indication as the first indicator; substantially as described.

31. In a computing scale, a weighing and price computing table having a plurality of rows of weight units of contrasting color, and a plurality of rows of price totals, an index having a plurality of rows of price units of contrasting color arranged side by side, said table and index being movable relatively to each other under the influence of the article to be weighed and valued, a pendulum coöperating with the index and arranged to resist such relative movement, means for increasing said resistance at will, and a visual indicator for indicating whether the resistance is increased or not and accordingly which color of weight units and price units are to be read; substantially as described.

32. In a computing scale, a weighing and price computing table having a plurality of rows of weight units of contrasting color, and a plurality of rows of price totals, an index having a plurality of rows of price units of contrasting color arranged side by side, said table and index being movable relatively to each other under the influence of the article to be weighed and valued, a pendulum coöperating with the index and arranged to resist such relative movement, means for increasing said resistance at will, and separate visual indicators for the customer and salesman respectively for indicating which color of weight units and of price units are to be read; substantially as described.

33. In a computing scale, a weighing and price computing table having two rows of weight units of which the numbers in one row are double those in the other, and having a plurality of rows of price totals, an index having two rows of price units corresponding to the respective rows of weight units, and of which the numbers in one row are double those in the other, a weighted pendulum coöperating with the index and computing table and opposing movement of them relatively to each other, a supplemental weight applicable to said pendulum to double the resistance offered by it to such relative movement of the index and table, a movable frame normally carrying such weight and arranged to transfer it to the pendulum, and a visual indicator to indicate which row of weight units and of price units are to be read accordingly as the supplemental weight is in coöperative relation with the pendulum or not; substantially as described.

34. In a pendulum scale, the combination of means under control of the operator for restoring the pendulum to normal position, and means adapted to place additional weight on the pendulum when in such position only.

35. In a pendulum scale, the combination with the pendulum and the indicating devices, of permanently located means for placing additional weight on the pendulum operable only when the latter is in a predetermined position, and means for returning the pendulum to such position.

36. In a pendulum scale, the combination with a pendulum, and indicating devices, of means for adding weight to the pendulum when in normal position, means for restoring the pendulum to normal position, and common means by which the weight depositing and pendulum restoring means are operable.

ALLEN DE VILBISS, Jr.

Witnesses:
D. R. McKay,
J. H. Gage.